(12) United States Patent
Gan et al.

(10) Patent No.: US 11,268,808 B2
(45) Date of Patent: Mar. 8, 2022

(54) DETECTION DEVICE FOR DETECTING LENS SURFACE IN STITCHING INTERFEROMETER

(71) Applicant: The Institute of Optics and Electronics, The Chinese Academy of Sciences, Sichuan (CN)

(72) Inventors: Dachun Gan, Chengdu (CN); Fuchao Xu, Chengdu (CN); Xin Jia, Chengdu (CN); Tingwen Xing, Chengdu (CN)

(73) Assignee: The Institute of Optics and Electronics, The Chinese Academy of Sciences, Sichuan (CN)

( * ) Notice: Subject to any disclaimer, the term of this patent is extended or adjusted under 35 U.S.C. 154(b) by 0 days.

(21) Appl. No.: 16/626,278

(22) PCT Filed: Mar. 5, 2019

(86) PCT No.: PCT/CN2019/076923
§ 371 (c)(1),
(2) Date: Dec. 23, 2019

(87) PCT Pub. No.: WO2020/172897
PCT Pub. Date: Sep. 3, 2020

(65) Prior Publication Data
US 2021/0381827 A1 Dec. 9, 2021

(30) Foreign Application Priority Data
Feb. 26, 2019 (CN) .......................... 201910141507.1

(51) Int. Cl.
*G01M 11/02* (2006.01)
*G01B 11/30* (2006.01)
(Continued)

(52) U.S. Cl.
CPC .......... *G01B 11/30* (2013.01); *G01B 9/02029* (2013.01); *G01B 11/2441* (2013.01);
(Continued)

(58) Field of Classification Search
CPC ............... G01B 11/30; G01B 11/2441; G01B 9/02029; G01M 11/0207; G01M 11/0271; G01M 11/04
See application file for complete search history.

(56) References Cited

U.S. PATENT DOCUMENTS

2006/0165397 A1\* 7/2006 Uehara ................. G03B 17/02
396/55

FOREIGN PATENT DOCUMENTS

| CN | 1818569 A | 8/2006 |
| CN | 101887160 A | 11/2010 |

(Continued)

OTHER PUBLICATIONS

International Search Report and Written Opinion dated Dec. 4, 2019, issued in corresponding International Patent Application No. PCT/CN2019/076923, filed Mar. 5, 2019, 11 pages.
(Continued)

*Primary Examiner* — Jonathan M Hansen
(74) *Attorney, Agent, or Firm* — Davis Wright Tremaine LLP; Michael J. Donohue (57) ABSTRACT

A detection device adapted to detect lens surface and a stitching interferometer including the same are disclosed. The detection device includes: a cylindrical detection frame comprising support bosses arranged on an inner wall of the detection frame in a circumferential direction of the detection frame, the lens to be detected being placed on the support bosses; and a plurality of support units mounted at a bottom of the detection frame in the circumferential direction of the detection frame, each of the support units
(Continued)

comprising: a support mechanism configured to be movable in an axial direction of the detection frame and cooperate with the support bosses so as to support the lens to be detected together; and a balance mechanism configured to provide a balancing force for balancing with force of the support mechanism for supporting the lens to be detected, so that axial support force of each supporting unit for the lens to be detected is equal to axial support force of each support boss for the lens to be detected in both cases where the axial direction of the detection frame is parallel to a gravity direction of the lens to be detected and inclined with respect to the gravity direction of the lens to be detected.

13 Claims, 6 Drawing Sheets (51) Int. Cl.
G01B 9/02015 (2022.01)
G01B 11/24 (2006.01)
G01M 11/04 (2006.01)

(52) U.S. Cl.
CPC .... *G01M 11/0207* (2013.01); *G01M 11/0271* (2013.01); *G01M 11/04* (2013.01)

(56) References Cited

FOREIGN PATENT DOCUMENTS

| | | |
|---|---|---|
| CN | 102788563 A | 11/2012 |
| CN | 102865809 A | 1/2013 |
| CN | 103575233 A | 2/2014 |
| CN | 104142129 A | 11/2014 |
| CN | 105423948 A | 3/2016 |
| CN | 105423989 A | 3/2016 |
| CN | 105627947 B | 4/2018 |
| CN | 108204789 A | 6/2018 |
| CN | 109341587 A | 2/2019 |
| JP | 11-259902 A | 9/1999 |

OTHER PUBLICATIONS

Chinese Office Action dated May 8, 2020, issued in Chinese Patent Application No. 201910141507.1, filed Sep. 28, 2008, 7 pages.

* cited by examiner

DETECTION DEVICE FOR DETECTING LENS SURFACE IN STITCHING INTERFEROMETER

CROSS-REFERENCE TO RELATED APPLICATION

This application is a 371 National Stage Patent Application of International Patent Application No, PCT/CN2019/076923, filed on Mar. 5, 2019, which claims priority to Chinese Patent Application No. 201910141507.1, filed on Feb. 26, 2019, in the National Intellectual Property Administration of China, the disclosures of which are incorporated herein by reference in their entirety.

FIELD OF THE INVENTION

The present application relates to an optical detection field, and relates to a detection device adapted to detect lens surface in a stitching interferometer and a stitching interferometer comprising the same.

BACKGROUND

A stitching interferometer divides a lens surface to be detected into a plurality of small sub-apertures, measures surfaces of the sub-apertures one by one, and then combines the surfaces of the sub-apertures into a surface of the whole lens by an algorithm. An automatic stitching interferometer has been proposed, which has realized automatic stitching detection of optical elements. However, such a stitching interferometer has low detection precision, and is generally only used as a process detection instrument in the machining of the lens. The most important reason for low precision is that during the stitching detection, the lens to be detected is required to be inclined and rotated to match a state of a reference lens or a standard lens. The incline will change forces applied to the lens to be detected, so that the lens to be detected is deformed. Deformation amount generated by the deformation is directly incorporated into the detection result, so that the detection may not be performed with high precision.

For a high-precision lens surface detection, accuracy and repeatability of the surface detection of the lens to be detected are closely related to the forces applied to the lens to be detected in a detection device. The detection device adopted by the existing stitching interferometer supports the lens to be detected in a manner that a bottom surface of the lens to be detected are flexibly supported by the detection device. Particularly, generally an axial support for the lens to be detected is realized by adopting a flexible material (such as plasticine), and a radial support of the detection device for the lens to be detected is realized by winding an adhesive tape around it. However, on the one hand, a support force for the lens to be detected offered by the flexible support cannot be measured accurately, so that the same support force cannot be provided in such flexible support manner during each surface detection, and thus the detection is unrepeatable; on the other hand, the flexible support manner is different from that of the lens to be detected in the real working state, so that there must be a difference between a surface result obtained by such a flexible support and the surface in the real working state, and thus accuracy of the detection result may not be ensured.

When a conventional interferometer is adopted to detect the surface of the lens, in order to ensure that the lens to be detected is subject to uniform and stable force in the detection process, the detection device usually includes a plurality of elastic supports at multiple positions uniformly distributed at a periphery of a bottom of the lens to be detected. And, the forces applied to the lens to be detected are ensured to be uniform and stable by precisely adjusting the support force of each elastic support. However, such a detection device with the multiple t elastic supports uniformly distributed at the periphery of the bottom may not be used for high-precision surface detection performed by the stitching interferometer. A key reason is that the lens to be detected needs to be inclined and rotated in the detection process performed by the stitching interferometer. Once the lens to be detected is inclined, a force balance state of the lens to be detected achieved under the horizontal condition will be broken. That is, after inclining the lens, an axial support force of the multiple elastic supports at the bottom of the lens to be detected is the same as that in the horizontal state, while an component of gravity of the lens to be detected in an optical axis direction is reduced, so that the axial support force of the detection device for the lens to be detected is larger than the axial component of the gravity of the lens to be detected, causing rigid displacement or surface change of the lens to be detected, thereby seriously affecting the accuracy and repeatability of detection for lens surface.

SUMMARY OF THE INVENTION

To solve the above problems, the present disclosure proposes a detection device used for detecting lens surface in a stitching interferometer which may ensure that the lens to be detected is subject to uniform and stable force during detecting, and the lens to be detected is always subject to uniform and stable force when the lens to be detected is inclined by a different angle.

According to an aspect of the present disclosure, there is provided a detection device adapted to detect lens surface, comprising: a cylindrical detection frame comprising support bosses arranged on an inner wall of the detection frame in a circumferential direction of the detection frame, the lens to be detected being placed on the support bosses; and a plurality of support units mounted at a bottom of the detection frame in the circumferential direction of the detection frame, each of the support units comprising: a support mechanism configured to be movable in an axial direction of the detection frame and cooperate with the support bosses so as to support the lens to be detected together; and a balance mechanism configured to provide a balancing force for balancing with force of the support mechanism for supporting the lens to be detected, so that axial support force of each supporting unit for the lens to be detected is equal to axial support force of each support boss for the lens to be detected in both cases where the axial direction of the detection frame is parallel to a gravity direction of the lens to be detected and inclined with respect to the gravity direction of the lens to be detected.

According to an exemplary embodiment of the present disclosure, the balance mechanism includes: a counterweight; an adjusting rod, the counterweight being arranged at one end of the adjusting rod, and the support mechanism being mounted at the other end of the adjusting rod; and a rotation shaft around which the adjusting rod rotates to incline the support units; wherein, the rotation shalt is located between the counterweight and the support mechanism, and the counterweight is configured to adjust the balancing force of the counterweight relative to the support mechanism so as to change the support force of the support mechanism for the lens to be detected.

According to an exemplary embodiment of the present disclosure, the counterweight is adjustably arranged at one end of the adjusting rod and configured to adjust a distance between the counterweight and the rotation shaft so as to change the support force of the support mechanism for the lens to be detected.

According to an exemplary embodiment of the present disclosure, the detection frame includes a plurality of mounting holes arranged at the bottom of the detection frame in the circumferential direction, the adjusting rod passing through the mounting hole to be mounted at the bottom of the detection frame, and the counterweight is located outside of the detection frame in the circumferential direction.

According to an exemplary embodiment of the present disclosure, the support unit includes a support base fixed on the detection frame, the rotation shaft being arranged in the support base.

According to an exemplary embodiment of the present disclosure, the detection frame includes a main body, a first extension portion horizontally extending from a lower end of the main body, and a second extension portion vertically extending downward from an end of the first extension portion away from the main body, the first extension portion and the second extension portion forming a receiving space in which the support base is disposed.

According to an exemplary embodiment of the present disclosure, the mounting hole is formed in the second extension portion, the adjusting rod being mounted by passing through the mounting hole.

According to an exemplary embodiment of the present disclosure, the detection frame includes a plurality of glue injection holes arranged on the main body in the circumferential direction, into which positioning glue is injected to fix the lens to be detected in a radial direction.

According to an exemplary embodiment of the present disclosure, the detection frame includes three support bosses arranged uniformly on the inner wall of the detection frame in the circumferential direction, the three support bosses being located in a same plane.

According to an exemplary embodiment of the present disclosure, the plurality of support units are uniformly arranged at the bottom of the detection frame in the circumferential direction.

According to an exemplary embodiment of the present disclosure, the support unit includes a fixing mechanism configured to fix a position of the counterweight on the adjusting rod.

According to an exemplary embodiment of the present disclosure, a support face of the support mechanism is coplanar with a support face of the support boss.

According to another aspect of the present disclosure, there is provided a stitching interferometer, comprising: the detection device according to any one of preceding embodiments; an interferometer positioned above the lens to be detected of the detection device and configured to detect surface of the lens to be detected; a mirror positioned between the interferometer and the lens to be detected and configured to direct light emitted by the interferometer to the lens to be detected; and a control unit communicating with the interferometer, the mirror and the detection device to issue control signals.

Compared with the technology in relevant art, the present disclosure has advantages as follows:

1) because the support force of each support unit for the lens to be detected may be measured and adjusted, the forces applied to the lens to be detected may be ensured to be consistent in the process of detecting the surface of the lens to be detected each time, and thus the surface detection result has repeatability.

2) because the support boss and the support unit support the lens to be detected in the same manner as that of the lens to be detected in the working state, the accuracy of the surface detection result may be ensured.

3) with above mentioned support structure, no matter how inclined angle of the lens to be detected changes in the detection process, the lens to be detected always keeps force balance, there is no rigid displacement of the lens to be detected, and the surface of the lens to be detected changes little, thus the repeatability and the accuracy of surface detection may be ensured.

BRIEF DESCRIPTION OF THE DRAWINGS

The present application will be described in further detail with reference to accompanying schematic drawings in which.

DESCRIPTION OF REFERENCE NUMERALS

Lens 101 to be detected, detection frame 102,
axial support unit 103, radial support unit 104,
lens 201 to be detected, detection frame 202 ( ),
support boss 203, elastic support unit 204,
detection device 300, lens 301 to be detected,
detection frame 302, support unit 303,
positioning glue 304, glue injection hole 3021,
support boss 3022, mounting hole 3023,
lens support rod 3031, support base 3032,
rotation shaft 3033, adjusting rod 3034,
counterweight 3035, fixing mechanism 3036,
stitching interferometer 400, interferometer 410,
mirror 420, control unit 430.

DETAILED DESCRIPTION OF PREFERRED EMBODIMENTS OF THE INVENTION

Figure 1A:
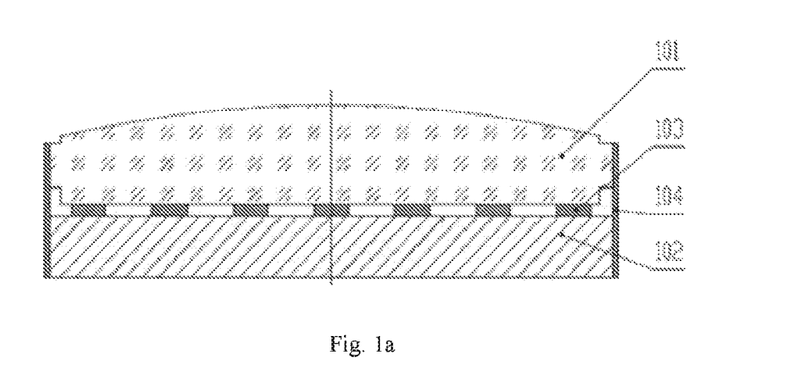
FIG. 1a is a cross-sectional view of a detection device used for detecting lens surface in a current stitching interferometer.
Figure 1B:
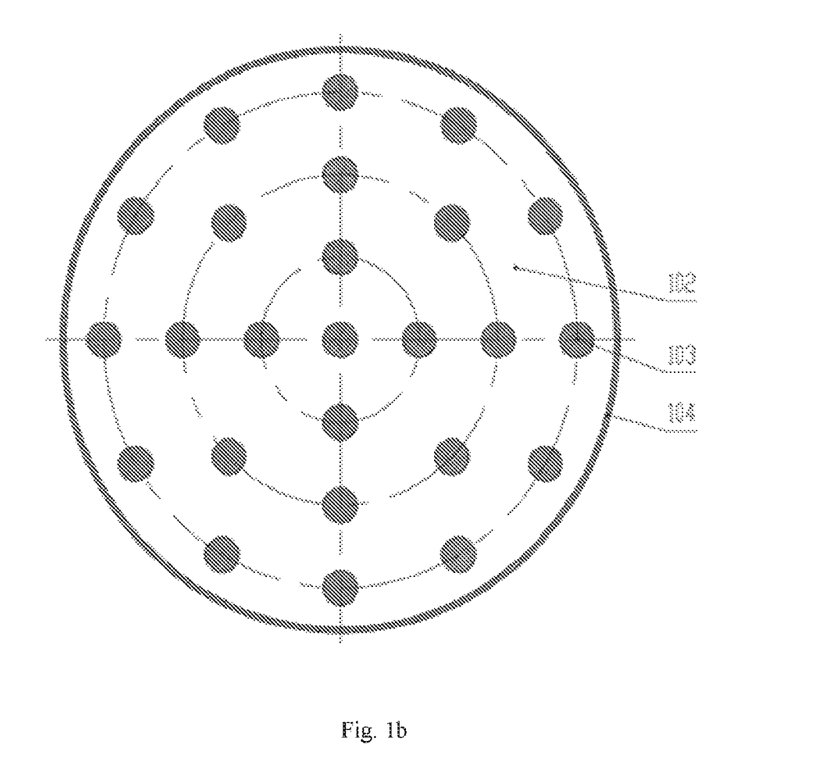
FIG. 1b is a top view of the detection device as shown in FIG. 1a with a lens to be detected being removed.

FIG. 1a is a cross-sectional view of a detection device used for detecting lens surface in a current stitching interferometer. As shown in FIG. 1a, the detection device includes a lens 101 to be detected, a detection frame 102, a plurality of axial support units 103 adapted to axially support and fix the lens 101 to be detected, and a radial support unit 104 adapted to radially support and fix the lens 101 to be detected. FIG. 1b is a top view of the detection device as shown in FIG. 1a with the lens to be detected being removed. As shown in FIGS. 1a and 1b, the axial support unit 103 is generally made of material with certain flexibility and plasticity, such as plasticine, and uniformly supports a bottom surface of the whole lens to be detected at multiple points; and the radial support unit 104 generally radially supports and fixes the lens 101 to be detected and the detection frame 102 by winding an adhesive tape around them.

However, structure of such a detection device is not suitable for detecting lens surface, but only for process detection during machining the lens. First, it is impossible to accurately measure the support force of the axial support unit 103 made of material with certain flexibility and plasticity for the lens 101 to be detected. This results in a different support force applied to the lens 101 to be detected each time the surface of the lens 101 to be detected is detected, so that the detection result is not repeatable and may not meet the requirement for the precision of the surface detection of the lens. Second, the bottom surface of the lens 101 to be detected is also a working surface in general and may not be used for support. In the real working state, the lens 101 to be detected is usually fixed in a manner of multi-point support at the periphery of the bottom surface. The manner of flexible multi-point support at the bottom surface when the surface of the lens 101 to be detected is being detected is different from that of support for the lens 101 to be detected in the real working state, thus there must be difference between the surface result detected when the lens is under the flexible multi-point support at the bottom surface and the surface in the real working state. The difference is unwanted for surface detection, and thus it is impossible to ensure the accuracy of the detection result.

Figure 2A:
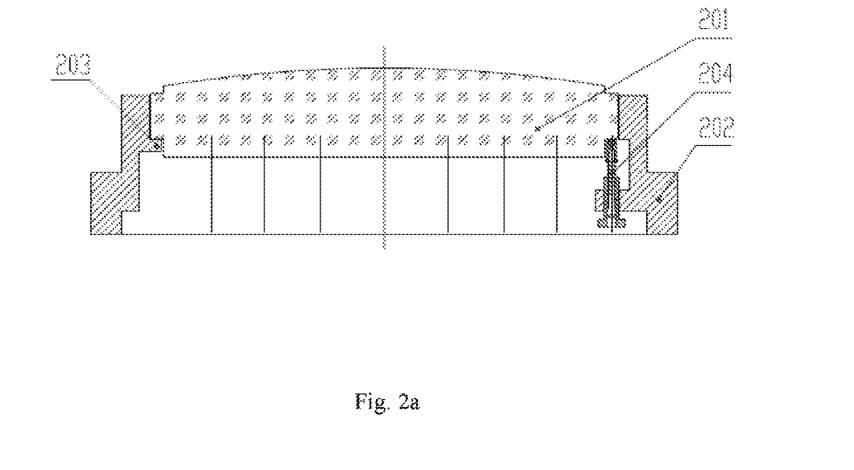
FIG. 2a is a cross-sectional view of a detection device used for detecting lens surface in a current conventional interferometer.
Figure 2B:
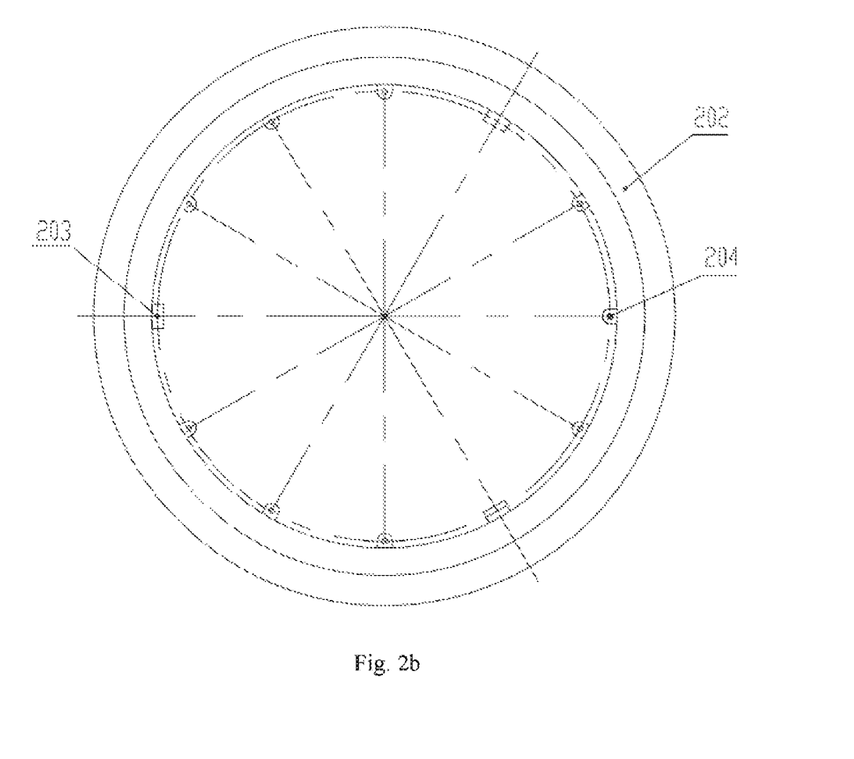
FIG. 2b is a top view of the detection device as shown in FIG. 2a with a lens to be detected being removed.

FIG. 2a is a cross-sectional view of a detection device used for detecting lens surface in a current conventional interferometer. As shown in FIG. 2a, the detection device includes a lens 201 to be detected, a detection frame 202, three support bosses 203 uniformly distributed on an inner wall of the detection frame in a circumferential direction, and a plurality of elastic support units 204. FIG. 2b is a top view of the detection device as shown in FIG. 2a with the lens to be detected being removed. As shown in FIGS. 2a and 2b, the plurality of elastic support units 204 are mounted at a bottom of the detection frame 202; the three support bosses 203 along with the plurality of elastic support units 204 forms supporting points uniformly distributed in the circumferential direction at the bottom of the detection frame 202. That is, the lens 201 to be detected is supported and fixed by both of three support bosses 203 and the plurality of elastic support units 204. The support force of elastic support units 204 for the lens 201 to be detected may be measured and adjusted by adjusting the deformation of the elastic support unit 204, so that finally it is ensured that the support force of each elastic support unit 204 for the lens 201 to be detected is equivalent to the support force of each support boss 203 for the lens 201 to be detected. And the axial support of the detection device for the lens 201 to be detected is an uniform multi-point support provided at the periphery of the bottom surface.

Such a support manner is adapted to high-precision surface detection for the following reasons: first, the support force of detection device for the lens 201 to be detected may be precisely measured and adjusted, which ensures that the forces applied to the lens 201 to be detected may be kept consistent in the process of detecting the surface of the lens 201 to be detected each time, and thus the surface detection result is repeatable; second, the detection device supports the lens 201 to be detected in a manner of uniform multi-point support provided at the periphery of the bottom surface, and the support manner when being detected is the same as that of the lens 201 to be detected in the working state, and thus the surface detection result is accurate. However, the detection device used in such a conventional interferometer is not applicable for stitching interferometer. Because during the detecting of the surface performed by the stitching interferometer, the lens to be detected at least should be inclined and rotated. Once the detection device is inclined, the component force of the gravity of the lens to be detected in the optical axis of the lens will be lowered, but the support force of each elastic support unit for the lens to be detected will not be changed. This causes the axial support force of the detection device for the lens to be detected is larger than the axial component force of the gravity of the lens to be detected, and thus the lens to be detected is displaced or deformed, which is unfavorable for detecting the surface.

Figure 3A:
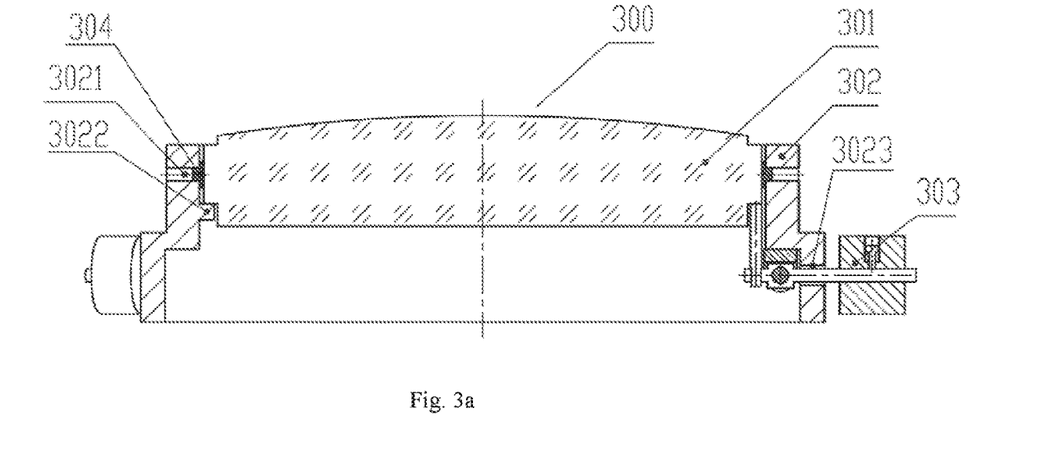
FIG. 3a is a cross-sectional view of a detection device used for detecting lens surface in a stitching interferometer according to an embodiment of the present disclosure.
Figure 3B:
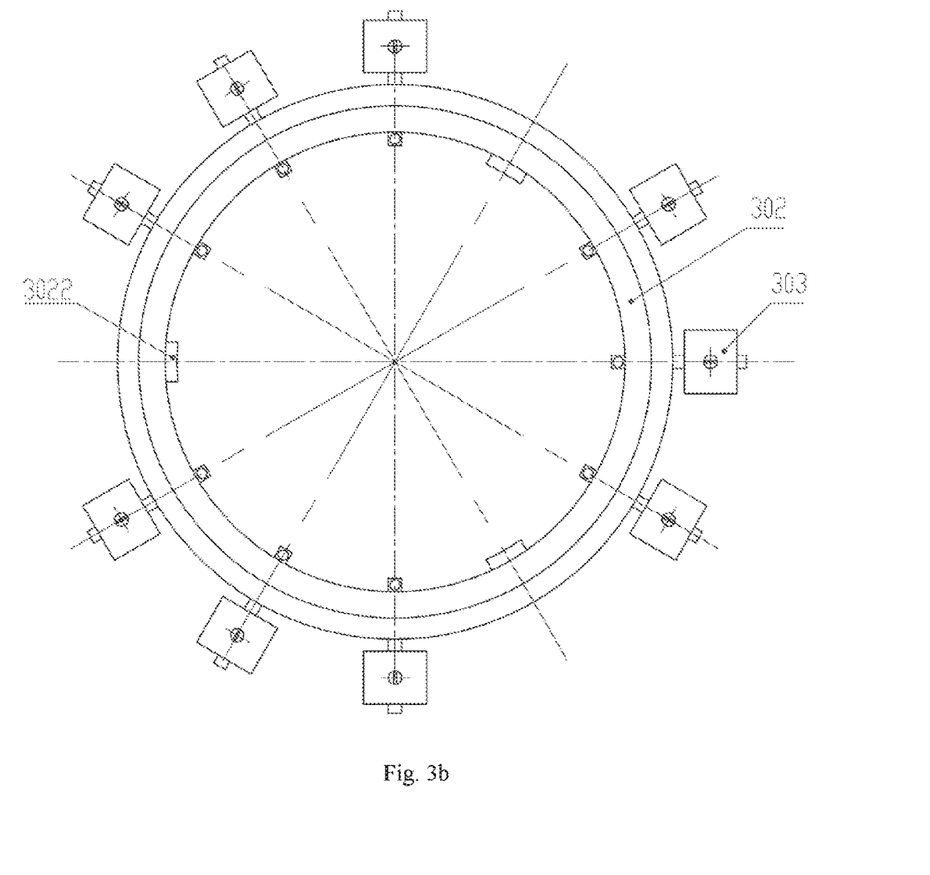
FIG. 3b is a top view of the detection device as shown in FIG. 3a with a lens to be detected being removed.

FIG. 3a is a cross-sectional view of a detection device used for detecting lens surface in a stitching interferometer according to an embodiment of the present disclosure; and FIG. 3b is a top view of the detection device as shown in FIG. 3a with a lens to be detected being removed. As shown in FIGS. 3s and 3b, the detection device 300 includes a lens 301 to be detected, a cylindrical detection frame 302, a plurality of support units 303 and much positioning glue 304 applied at a plurality of positions. In an embodiment, an inner wall of the detection frame comprises circumferentially distributed support bosses 3022 on which the lens 301 to be detected is placed. As shown in FIGS. 3a and 3b, the inner wall of the detection frame includes three uniformly circumferentially distributed support bosses 3022 which are located in the same plane.

Figure 4:
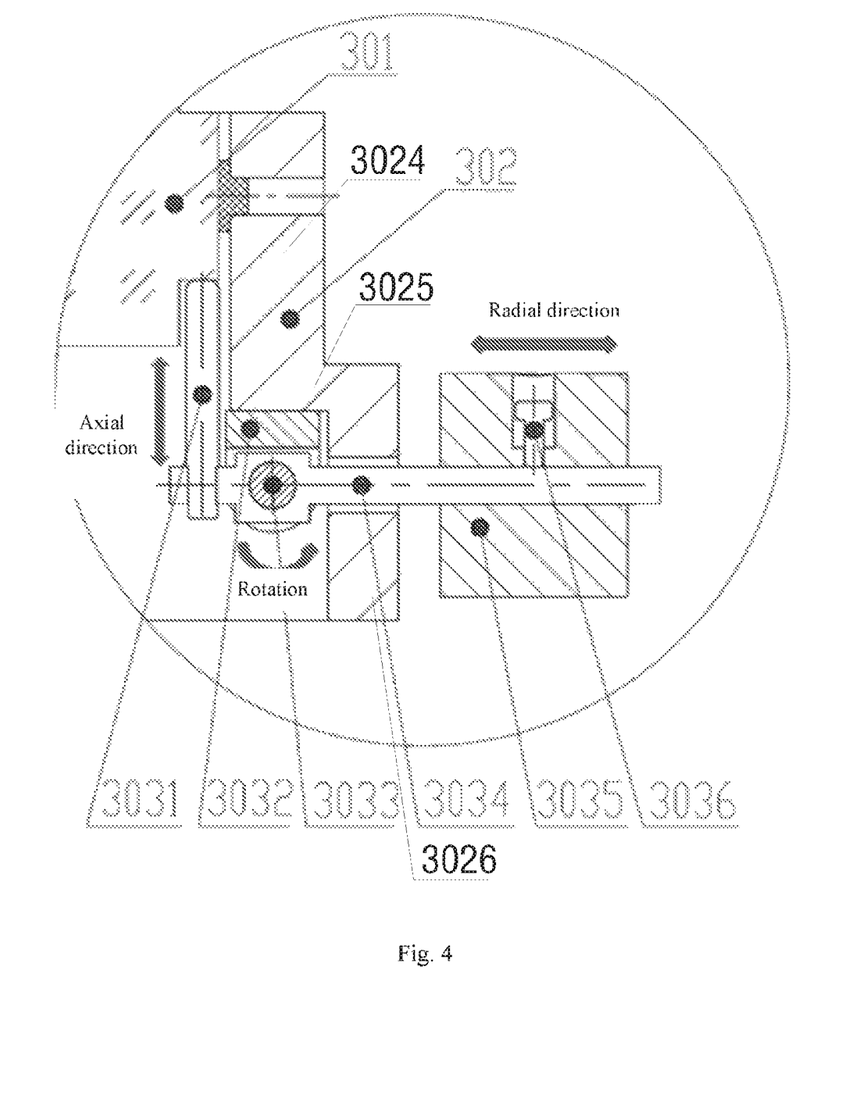
FIG. 4 is a partially enlarged view of the detection device as shown in FIG. 3a, wherein the detection device includes a support unit.

FIG. 4 is a partially enlarged view of the detection device as shown in FIG. 3a. As shown in FIG. 4, the support unit 303 includes a support mechanism, a support base 3032, a rotation shaft 3033, an adjusting rod 3034, a counterweight 3035 and a fixing mechanism 3036. In an embodiment, the support mechanism includes a support rod 3031 adjustable in an axial direction of the detection frame 302, end face of the support rod 3031 supporting an edge of bottom surface of the lens 301 to be detected. In an embodiment, the rotation shaft 3033 is arranged in the support base 3032 through a bearing, and the support base 3032 is fixed in the detection frame 302. As shown in FIG. 4, the counterweight 3035 is adjustably arranged at one end (right end in FIG. 4) of the adjusting rod 3034 and is adapted to be moved along the adjusting rod 3034 in a radial direction of the detection frame 302; and, the support rod 3031 is mounted at the other end (left end in FIG. 4) of the adjusting rod 3034, and the adjusting rod 3034 is adapted to be freely rotatable about the rotation shaft 3033. In this way, the adjusting rod 3034 forms a lever structure by taking the rotation shaft 3033 as a fulcrum, and the support force of the support rod 3031 for the lens 301 to be detected may be changed by adjusting the balance force of the counterweight 3035 relative to the support rod 3031. In an embodiment, the support force of the support rod 3031 for the lens 301 to be detected may be changed by adjusting a position of the counterweight 3035 on the adjusting rod 3034. In a further embodiment, the support force of the support rod 3031 for the lens 301 to be detected may be changed by adjusting the gravity of the counterweight 3035.

When the surface of the lens to be detected is detected, the balance force of each counterweight 3035 relative to the support rod is adjusted (for example, the position of the counterweight on the adjusting rod 3034 is adjusted) so as to ensure that the support forces of all the support units 303 for the lens 301 to be detected are equal to one another, and that the support force of each support unit 303 for the lens 301 to be detected is equivalent to that of each support boss 3022 for the lens 301 to be detected, and the lens 301 to be detected is uniformly supported at multiple points on the periphery of the bottom surface by the three support bosses 3022 and the plurality of support units 303.

As shown in FIG. 4, the support unit further comprises the fixing mechanism 3036. In an embodiment, the fixing mechanism 3036 is arranged on the counterweight 3035. When the counterweight 3035 is adjusted or moved to a desired position along the adjusting rod, the counterweight is fixed at that position with the use of the fixing mechanism 3036. In an embodiment, the fixing mechanism 3036 includes a bolt.

As shown in FIG. 4, the detection frame 302 includes a main body 3024, a first extension portion 3025 horizontally extending from a lower end of the main body, and a second extension portion 3026 vertically extending downward from an end of the first extension portion away from the main body. The main body 3024 is circumferentially provided with a plurality of glue injection holes 3021, into which the positioning glue 304 is injected to fix the lens to be detected in the radial direction. The first extension portion 3025 and the second extension portion 3026 form a receiving space in which the support base 3032 is disposed. A plurality of mounting holes 3023 are formed in the circumferential direction of the second extension portion 3026, and the adjusting rod 3034 passes through the mounting hole 3023 so as to mount the support unit 303 at the bottom of the detection frame 302.

In the embodiment of the present disclosure, no matter how inclined angle of the lens to be detected changes in the detection process, the forces applied to the lens to be detected always reach a balance, there is no rigid displacement of the lens to be detected, and the surface of the lens to be detected changes little. Thus the repeatability and the accuracy of surface detection may be ensured. The forces applied to the lens to be detected will be described and analyzed below in connection with FIGS. 5a and 5b.

Figure 5:
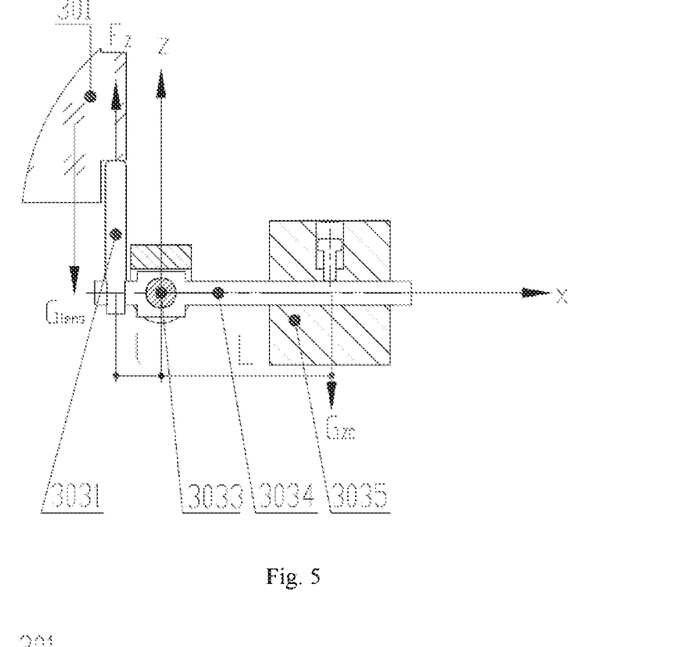
FIG. 5a is a schematic view illustrating a support force of the support unit for the lens to be detected in a horizontal state.
FIG. 5b is a schematic view illustrating the support force of the support unit for the lens to be detected after the detection device as shown in FIG. 3a is inclined by an angle θ.

As shown in FIG. 5a, the gravity of the lens 301 to be detected is Glens, the support force of each support unit 303 to the lens 301 to be detected is Fz, the gravity of the counterweight 3035 is Gzc, the arm length at a counterweight side is L, and the arm length at a lens side is 1. Since the support force of each of the three support bosses 3022 for the lens to be detected is equivalent to that of each of the plurality of support units 303 for the lens to be detected, according to the requirement of force balance: Gens=(N+3)*Fz, where N is the number of support units. That is, the gravity of the lens 301 to be detected is equal to the sum of the support forces of the N support units 303 for the lens 301 to be detected and the support forces of the three support bosses 3022 for the lens 301 to be detected. According to the lever principle, obtain Fz*1=Gzc*L. Therefore, Glens=(N+3)*Gzc*L/1. The number N of the support units 303 may be calculated according to an actual size of the lens to be detected.

Figure 5B:
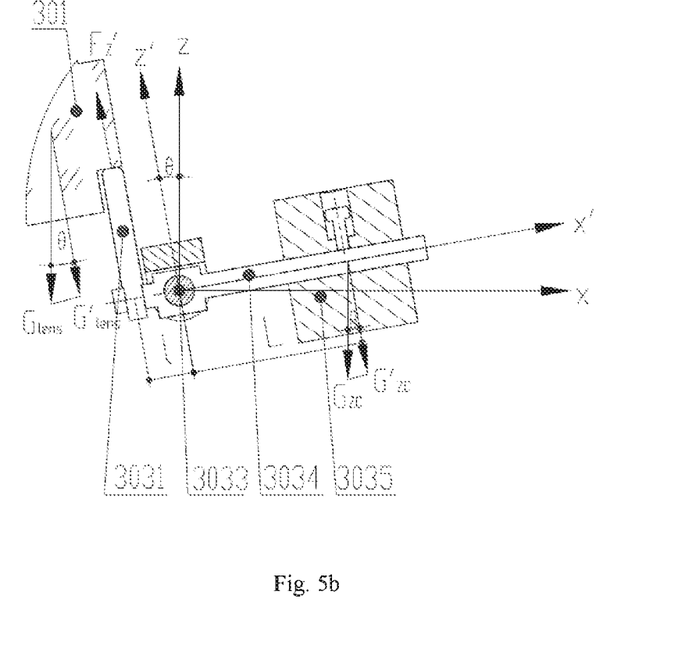

As shown in FIG. 5b, after the lens 301 to be detected is inclined by the angle θ, the component force of gravity in the direction of optical axis is G'lens=Glens*cos (θ). The component force of gravity of the counterweight 3035 in the direction of optical axis is G'zc=Gzc*cos (θ), according to the lever principle, obtain Fz' *1=G'zc*L=Gzc*L*cos (θ). After being inclined by the angle θ, the sum of the support forces of the N support units 303 for the lens 301 to be detected and the support forces of three support bosses 3022 for the lens 301 to be detected is: (N+3)*Fz'=(N+3) *Gzc*L*cos (θ)/1=Glens*cos (θ)=G'lens. As seen from the derivate formula, after the lens 301 to be detected is inclined by the angle θ, the sum of the support forces of the N support units 303 for the lens 301 to be detected and the support forces of three support bosses 3022 for the lens 301 to be detected always equals to the component force of the gravity of the lens 301 to be detected in the direction of optical axis. The lens 301 to be detected is always under a force balance state in the direction of optical axis. Therefore, the structure of the detection device may ensure that the lens to be detected always keeps balanced and uniform force no matter how the lens to be detected is inclined in the process of detecting the surface of the lens to be detected in the stitching interferometer. In an embodiment, during inclining the lens 301 to be detected by the angle θ, the adjusting rod 3034 is configured to remain perpendicular to the support mechanism at all times.

Figure 6:
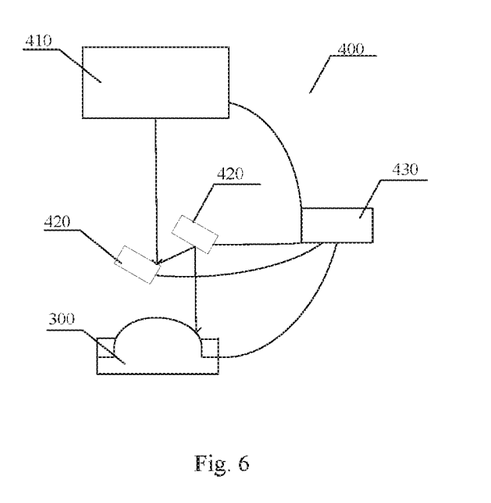
FIG. 6 is a schematic diagram of a stitching interferometer according to an embodiment of the present disclosure.

FIG. 6 is a schematic diagram of a stitching interferometer according to an embodiment of the present disclosure. As shown in FIG. 6, the stitching interferometer 400 includes an interferometer 410, a mirror 420, a control unit 430, and the detection device 300. The detection device 300 is the detection device of any of the above-described embodiments of the present disclosure. The interferometer 410 is positioned above the lens to be detected of the detection device, and the mirror 420 is positioned between the interferometer 410 and the lens to be detected. In the illustrated embodiment, the stitching interferometer includes two mirrors 420, but the present disclosure is not limited thereto. Light from the interferometer 410 is directed by the mirror 420 onto the lens to be detected. The control unit 430 communicates with the interferometer 410, the mirror 420 and the detection device 300 to issue control signals so as to control the interferometer 410, the mirror 420, and the detection device 300. When detecting, adjusting the lens to be detected to a proper position by the detection device 300, then directing the light emitted by the interferometer to the lens to be detected by the mirror, and then detecting the surface of a sub-aperture; and repeating the above process, and combining the surfaces of the sub-apertures into the surface of the whole lens via an algorithm, thereby completing the surface detection of the lens to be detected.

It should be appreciated for those skilled in this art that the above embodiments are intended to be illustrated, and not restrictive. Modifications may be made to the above embodiments by those skilled in this art, and structures described in various embodiments may be freely combined with each other without conflicting in configuration or principle.

Although the present disclosure is described in combination with the accompanying drawings, the embodiments disclosed in the drawings are intended to exemplarily illustrate the preferred embodiments of the present disclosure, and should not be construed as being limited to the present disclosure.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

It should be noted that the word "comprise" or "include" should be understood as not excluding other element or step, and the word "a" or "an" should be understood as not excluding plural of said elements or steps, unless such exclusion is explicitly stated.

What is claimed is:

1. A detection device adapted to detect a lens surface, wherein, the detection device comprises:
   a cylindrical detection frame comprising support bosses arranged on an inner wall of the detection frame in a circumferential direction of the detection frame, the lens to be detected being placed on the support bosses; and
   a plurality of support units mounted at a bottom of the detection frame in the circumferential direction of the detection frame, each of the support units comprising:
   a support mechanism configured to be movable in an axial direction of the detection frame and cooperate with the support bosses so as to support the lens to be detected together; and
   a balance mechanism configured to provide a balancing force for balancing with a force of the support mechanism for supporting the lens to be detected, so that axial support force of each supporting unit for the lens to be detected is equal to axial support force of each support boss for the lens to be detected in both cases where the axial direction of the detection frame is parallel to a gravity direction of the lens to be detected and inclined with respect to the gravity direction of the lens to be detected.

2. The detection device according to claim 1, wherein, the balance mechanism comprises:
   a counterweight;
   an adjusting rod, the counterweight being arranged at one end of the adjusting rod, and the support mechanism being mounted at the other end of the adjusting rod; and
   a rotation shaft around which the adjusting rod rotates so as to incline the support unit;
   wherein, the rotation shaft is located between the counterweight and the support mechanism, and the counterweight is configured to adjust the balancing force of the counterweight relative to the support mechanism so as to change the support force of the support mechanism for the lens to be detected.

3. The detection device according to claim 2, wherein, the counterweight is adjustably arranged at one end of the adjusting rod and configured to adjust a distance between the counterweight and the rotation shaft so as to change the support force of the support mechanism for the lens to be detected.

4. The detection device according to claim 2, wherein, the detection frame comprises a plurality of mounting holes arranged at the bottom of the detection frame in the circumferential direction, the adjusting rod passing through the mounting hole to be mounted at the bottom of the detection frame, and the counterweight being located outside of the detection frame in the circumferential direction.

5. The detection device according to claim 4, wherein, the support unit comprises a support base fixed on the detection frame, the rotation shaft being arranged in the support base.

6. The detection device according to claim 5, wherein, the detection frame comprises a main body, a first extension portion horizontally extending from a lower end of the main body, and a second extension portion vertically extending downward from an end of the first extension portion away from the main body, the first extension portion and the second extension portion forming a receiving space in which the support base is disposed.

7. The detection device according to claim 6, wherein, the mounting hole is formed in the second extension portion, the adjusting rod being mounted by passing through the mounting hole.

8. The detection device according to claim 6, wherein, the detection frame comprises a plurality of glue injection holes arranged on the main body in the circumferential direction, into which positioning glue is injected to fix the lens to be detected in a radial direction.

9. The detection device according to claim 6, wherein, the detection frame comprises three support bosses arranged uniformly on the inner wall of the detection frame in the circumferential direction, the three support bosses being located in a same plane.

10. The detection device according to claim 9, wherein, the plurality of support units are uniformly arranged at the bottom of the detection frame in the circumferential direction.

11. The detection device according to claim 2, wherein, the support unit comprises a fixing mechanism configured to fix a position of the counterweight on the adjusting rod.

12. The detection device according to claim 2, wherein, a support face of the support mechanism is coplanar with a support face of the support boss.

13. A stitching interferometer, wherein, the stitching interferometer comprises:
   the detection device according to claim 1; and
   an interferometer positioned above the lens to be detected of the detection device and configured to detect surface of the lens to be detected;
   a mirror positioned between the interferometer and the lens to be detected and configured to direct light emitted by the interferometer to the lens to be detected; and
   a control unit communicating with the interferometer, the mirror and the detection device to issue control signals.

* * * * *